Sept. 17, 1940. P. F. BERRY 2,215,385
FASTENING DEVICE
Filed Sept. 1, 1938
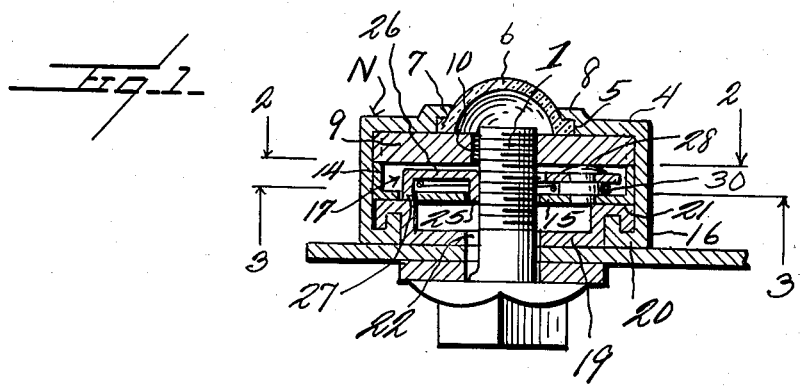
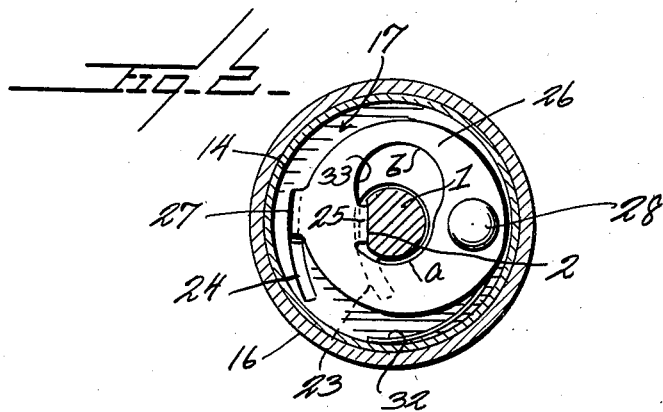
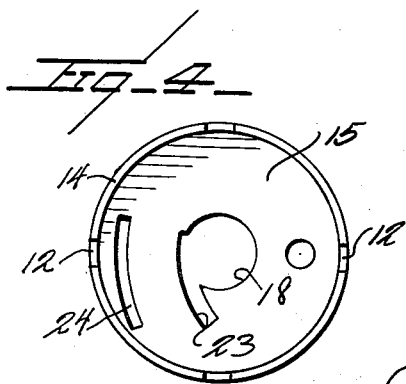
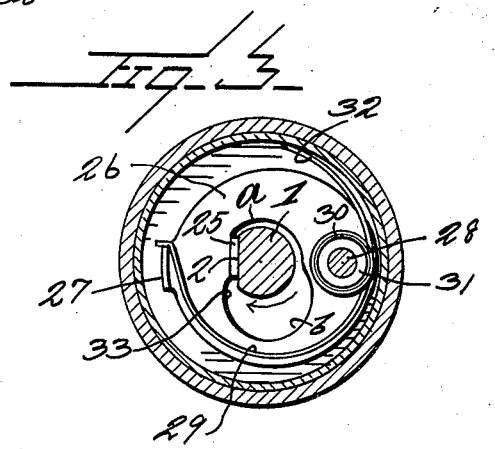
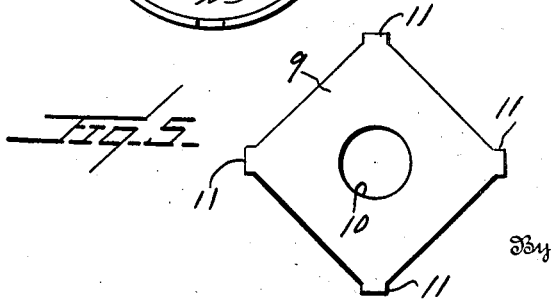
Inventor
P. F. Berry
By Watson E. Coleman
Attorney Patented Sept. 17, 1940

2,215,385

UNITED STATES PATENT OFFICE 2,215,385

FASTENING DEVICE

Paul F. Berry, Columbus, Ohio

Application September 1, 1938, Serial No. 228,016

2 Claims. (Cl. 151—12)

This invention relates to a fastening device, and it is an object of the invention to provide a device of this kind comprising a threaded bolt and a nut each of which is so constructed as to coact one with the other to readily permit the bolt to complete its binding action but effectively holding the bolt against retrograde rotation such as would result in the separation of the nut and bolt.

It is also an object of the invention to provide a fastening means comprising a nut and bolt, the shank of the bolt being provided with a flattened face extending lengthwise thereof for coaction with a locking member mounted within the nut in a manner to permit the bolt to complete its binding function but contacting with the flattened face of the shank of the bolt to hold said bolt against retrograde rotation.

The invention consists in the details of construction and in the combination and arrangement of the several parts of my improved fastening device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view partly in section and partly in elevation illustrating a fastening device constructed in accordance with an embodiment of my invention;

Figure 2 is a sectional view taken substantially on the line 2—2 of Figure 1, looking in the direction of the arrow;

Figure 3 is a sectional view taken substantially on the line 3—3 of Figure 1, looking in the direction of the arrow;

Figure 4 is a view in plan of the locking plate unapplied;

Figure 5 is a view in plan of the nut unapplied.

As disclosed in the accompanying drawing, 1 denotes the shank of a bolt provided with the usual threads and which threads are interrupted by a flattened face 2 extending lengthwise of the shank 1 and of desired width.

The nut N comprises an outer shell of a general cup-like formation having a body plate 4 provided with a cutout portion to afford a central opening 5. Extending outwardly through this opening 5 is a dome-like disk 6 preferably of glass and of a color the same as one of the colors of a license plate when the bolt is employed as a means for holding a license plate to a car. As herein disclosed, the marginal portion of this disk 6 is defined by an outstanding flange 7 which fits beneath a marginal bead 8 defining the central opening 5 whereby the disk 6 is effectually maintained in applied position. It is to be stated that this disk may be of other design and may also be maintained in position by means other than herein described and illustrated.

Within the shell and in close contact with the inner face of the body plate 4 is a nut 9 having a central opening 10 into which the shank 1 threads. This nut 9, as herein disclosed, is substantially square in plan and is provided at its corner portions with the lugs 11 which snugly engage within the notches 12 provided in the free marginal portion of an upstanding flange 14 defining the peripheral margin of a plate 15. This plate 15 is of a diameter to cause the peripheral flange 14 to have close contact with the inner face of the side wall 16 of the shell.

The mounting of the nut 9 with respect to the plate 15 is such as to provide a space or chamber 17 therebetween for a purpose to be hereinafter more particularly referred to. The plate 15 is provided at its axial center with an opening 18 of such diameter to permit free insertion therethrough of the shank 1 of the bolt.

Closing the open face of the shell is a cleat plate 19, the marginal portions of which interlocked, as at 20, with the side wall 16 of the shell in a manner to provide an internal shoulder 21 which bears against the applied plate 15 to maintain the same in effective assembly within the shell.

It is to be particularly observed that the interfitting connection 20 is such to prevent the possibility of a tool being inserted to spread out the side wall 16 of the shell without completely destroying the nut. This interfitting connection as illustrated in the accompanying drawing is accomplished by raising the marginal portion of the plate 19 to form an outwardly facing channel into which snugly engages a returned portion of the side wall 16. This interfitting connection can be readily effected by proper machinery. This plate or washer 19 is also provided with a central opening 22 through which the shank 1 of the bolt freely passes.

The plate 15 is provided with a slot 23 extending to one side of the opening 18 and in communication with such opening, and said plate 15 outwardly of the slot 23 is provided with a second arcuate slot 24. The slot 23 receives a locking lug 25 carried by a swinging plate 26 while the second slot 24 has working therein a lug 27 also carried by the plate 26. The plate 26, as herein disclosed, is substantially elliptical in form and overlies the inner face of the plate 15 and said plate 15 at one end thereof is pivotally secured to the plate 15 by a collar rivet 28. The lug 27 is positioned at the opposite end of this plate 26 and bearing against the lug 27 is an end portion of a spring arm 29 continued from an end of a coil 30 surrounding the collar 31 of the rivet 28. The opposite end of this coil 30 is continued by a second spring arm 32 which bears against the adjacent portion of the flange 14 of the plate 15.

The plate 26 is provided transversely across its central portion with an elongated opening 33. One end portion $a$ of such opening 33 is restricted with respect to the opposite end portion $b$. The lug 25 is at the extremity of the defining edge of the portion $a$ of the opening 33 remote from the pivotal mounting or rivet 28. The restricted portion $a$ of the opening 33 is such that when the plate 26 is at its normal position or at the limit of its movement as exerted by the spring arm 29, the lug 25 will be in a position to overlie the flattened portion 2 of the shank 1 of the applied bolt and thereby effectively hold said bolt against retrograde rotation. However, as the shank 1 is rotated in a direction to thread into the central opening 10 of the nut 9, the plate 26 will readily swing in a direction to permit the desired rotation of the shank 1 so that the bolt can complete its binding function.

The enlarged portion $b$ of the opening 33 is of such diameter that when the plate 26 is in its outer position during the functioning rotation of the plate 1, the plate 26 will be free of contact with such shank 1 and therefore offer no hindrance or obstruction thereto.

From the foregoing description it is thought to be obvious that a fastening device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A fastening device comprising a threaded shank having a flattened face extending therealong, a nut into which the shank is freely insertible, said nut comprising a shell having a body plate and a side flange, two spaced plates within the shell, the inner plate being provided with an opening into which the shank threads, the outer plate being also provided with an opening through which the shank passes, a plate positioned between the two spaced plates, means for pivotally connecting said last plate to one of the spaced plates, said pivotal connection being to one side of the opening in each of the spaced plates, the pivotal mounting for the last named plate permitting the same to have swinging movement, said last named plate having an elongated opening through which the shank passes, said opening in the last named plate having one end portion restricted, a lug carried by said last named plate adjacent to the restricted portion of the opening for engagement with the flattened face of the shank when the shank is disposed through the restricted portion of the opening of the last named plate, a spring for normally maintaining the swinging plate in a position to have the shank in the restricted portion of the opening and the lug of the swinging plate in position for contact with the flattened face of the shank.

2. A fastening device comprising a threaded shank having a flattened face extending therealong, a nut into which the shank is freely insertible, said nut comprising a shell having a body plate and a side flange, two spaced plates within the shell, the inner plate being provided with an opening into which the shank threads, the outer plate being also provided with an opening through which the shank passes, a plate positioned between the two spaced plates, means for pivotally connecting said last plate to one of the spaced plates, said pivotal connection being to one side of the opening in each of the spaced plates, the pivotal mounting for the last named plate permitting the same to have swinging movement, said last named plate having an elongated opening through which the shank passes, said opening in the last named plate having one end portion restricted, a lug carried by said last named plate adjacent to the restricted portion of the opening for engagement with the flattened face of the shank when the shank is disposed through the restricted portion of the opening of the last named plate, a spring for normally maintaining the swinging plate in a position to have the shank in the restricted portion of the opening and the lug of the swinging plate in position for contact with the flattened face of the shank, said lug of the swinging plate extending within the restricted portion of the opening, the larger end of the opening being of a diameter to offer no hindrance to the relative rotation of the shank and nut when the swinging plate is in a position to have the shank within said larger end of the opening.

PAUL F. BERRY.